(12) United States Patent
Ito et al.

(10) Patent No.: US 7,062,909 B2
(45) Date of Patent: Jun. 20, 2006

(54) HYDRAULIC CONTINUOUSLY VARIABLE TRANSMISSION

(75) Inventors: Katsuhiko Ito, Saitama (JP); Masaaki Negoro, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 10/804,474

(22) Filed: Mar. 19, 2004

(65) Prior Publication Data

US 2004/0206079 A1    Oct. 21, 2004

(30) Foreign Application Priority Data

Mar. 31, 2003  (JP) ............................. 2003-096814

(51) Int. Cl.
*F16D 39/00* (2006.01)
(52) U.S. Cl. ...................................................... 60/487
(58) Field of Classification Search .................. 60/487
See application file for complete search history.

(56) References Cited

U.S. PATENT DOCUMENTS 4,781,022 A * 11/1988 Hayashi et al. ............... 60/489
5,353,595 A * 10/1994 Hayashi et al. ............... 60/489
6,588,207 B1 * 7/2003 Pouliot ........................ 60/487
2002/0007633 A1 * 1/2002 Saito et al. .................... 60/489

FOREIGN PATENT DOCUMENTS

| JP | 63140163 | 6/1988 |
| JP | 06002753 | 1/1994 |

* cited by examiner

*Primary Examiner*—F. Daniel Lopez
(74) *Attorney, Agent, or Firm*—Carrier, Blackman & Associates, P.C.; William D. Blackman; Joseph P. Carrier

(57) ABSTRACT

A hydraulic continuously variable transmission with a fixed displacement type swash plate plunger pump and a variable displacement type swash plate plunger motor are connected to each other through a closed hydraulic circuit. A motor pivot member is supported to be pivotally movable in a support member. The motor pivot member includes an upwardly extending arm portion. The tip end of the arm portion is movable in the axial direction by a motor servo mechanism, to pivotally move the motor pivot member. A transmission housing is provided with an auxiliary portion surrounding the motor servo mechanism and the tip of the arm portion, and a servo motor is mounted to a side surface on one end side, in the direction of the axis of rotation of an output shaft. A side of the housing auxiliary portion, opposite the servo motor, includes an identification number display portion.

7 Claims, 9 Drawing Sheets

HYDRAULIC CONTINUOUSLY VARIABLE TRANSMISSION

CROSS-REFERENCE TO RELATED APPLICATIONS

The present invention claims priority under 35 USC 119 based on Japanese patent application No. 2003-096814, filed Mar. 31, 2003.

BACKGROUND OF THE INVENTION

1. Field of the Invention

The present invention relates to a swash plate control mechanism for pivotally moving a swash plate, and to a hydraulic continuously variable transmission incorporating same. More particularly, the present invention relates to a swash plate control mechanism for pivotally moving a swash plate member, in a hydraulic swash plate plunger unit which may be a swash plate plunger pump or a swash plate plunger motor, and to a hydraulic continuously variable transmission incorporating the described control mechanism.

2. Description of the Background Art

A variety of forms and configurations of hydraulic continuously variable transmissions, including a hydraulic pump and a hydraulic motor in combination, have been known and put to practical use.

One example of a commercial hydraulic continuously variable transmission was sold by Honda and marketed under the trademark "Hondamatic" on the 2001 Honda Fourtrax Foreman Rubicon™ TRX500 ATV.

Another example of a hydraulic continuously variable transmission is disclosed in Japanese Patent Laid-open No. Hei 6-2753 and Japanese Patent Publication No. Hei 7-88884 proposed by the present applicant.

The hydraulic continuously variable transmission disclosed in these documents includes a swash plate plunger pump, a swash plate plunger motor, and a closed hydraulic circuit for connecting a discharge port and a suction port of the swash plate plunger pump to a suction port and a discharge port of the swash plate plunger motor, respectively.

In the hydraulic continuously variable transmission described in the reference, a pump swash plate member is driven by an engine, a pump cylinder and a motor cylinder are connected to each other and disposed on an output shaft. A motor swash plate member is restricted in rotation, and the motor swash plate angle can be variably regulated.

In the referenced hydraulic continuously variable transmission, the pump cylinder and the motor cylinder are connected to each other in a back-to-back relationship, and pump and motor distribution valves (distributor valves) are disposed at the connected portion, thereby forming the closed hydraulic circuit.

These pump and motor distribution valves are so structured that oil, discharged from a pump plunger reciprocated in the pump cylinder according to the rotation of the pump swash plate, is supplied into a motor cylinder chamber to push the motor plunger. Hydraulic pressure moves the motor plunger in the axial direction in sliding contact with the motor swash plate, thereby driving the motor cylinder to rotate.

In some hydraulic continuously variable transmissions and similar powertrain components, an identification mark, representing a model number, a product number and the like, may be stamped on an outside surface of the housing. Such an identification mark is located at a position such that the identification mark can be viewed from the outside, not only in the condition where the transmission is in a singular state, but also where the transmission is mounted on a vehicle.

For example, it is generally known that a cylinder block, in a V-type engine, may be provided with a machined stamping surface, to receive an identifying serial number or the like stamped thereon.

In the hydraulic continuously variable transmission disclosed in the above reference, however, the identification mark display portion is not located on the housing where the identification mark can be easily viewed from the exterior. As a result, external identification can be difficult to make, where the transmission is mounted on a vehicle.

Although the known devices have some utility for their intended purposes, there is still a need to provide an improved swash plate control mechanism, and for a hydraulic continuously variable transmission incorporating an improved swash plate control apparatus.

More particularly, there is a need for an improved swash plate servo mechanism for pivotally moving a swash plate member, in a hydraulic swash plate plunger unit, including a swash plate plunger pump and a swash plate plunger motor.

SUMMARY OF THE INVENTION

The present invention has been made in consideration of the above problem. Accordingly, it is an object of the present invention to provide a hydraulic continuously variable transmission structured such that an identification mark display portion can be located on the housing where the identification mark can be easily viewed from the exterior, even when the transmission is installed on a vehicle.

In order to attain the above object, according to a selected illustrative embodiment of the present invention, there is provided a hydraulic continuously variable transmission including a swash plate plunger pump (hydraulic pump P) and a swash plate plunger motor (hydraulic motor M), connected to each other through a closed hydraulic circuit.

The hydraulic continuously variable transmission according to the illustrative embodiment also includes a transmission housing for containing internal components of the transmission, and a movable swash plate, which may be part of the swash plate plunger pump or the swash plate plunger motor.

The movable swash plate is supported to be pivotally movable about a pivot axis extending in a direction perpendicular to the axis of rotation of an output shaft of the transmission (for example, by a motor pivot member for supporting a motor swash plate member in the illustrative embodiment).

The hydraulic continuously adjustable transmission also includes a swash plate adjustment mechanism for pivotally moving the movable swash plate (a motor servo mechanism SV in the illustrative embodiment).

The transmission housing is provided with a base portion and an auxiliary portion integrally formed with, and extending upwardly from the base portion. The auxiliary portion is provided for supporting the swash plate adjustment mechanism, which includes a servo motor attached to a side surface of the housing auxiliary portion. The servo motor is oriented with a longitudinal axis thereof parallel to the axis of rotation of the output shaft.

An identification mark display portion is provided on a side surface of the housing auxiliary portion substantially opposite the servo motor.

According to the hydraulic continuously variable transmission of the embodiment described above, the swash plate adjustment mechanism extends upwardly relative to the base of the transmission housing, so that the auxiliary portion of the transmission housing, surrounding part of the swash plate adjustment mechanism, also extends upwardly, and the side surface of the auxiliary portion, on the opposite side from the servo motor, can be advantageously used for the identification mark display portion.

Since the identification mark display portion is provided on an upwardly extending side surface of the auxiliary portion, as mentioned, the identification mark can be easily viewed from the exterior, even where the hydraulic continuously variable transmission is installed on a vehicle.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 2:
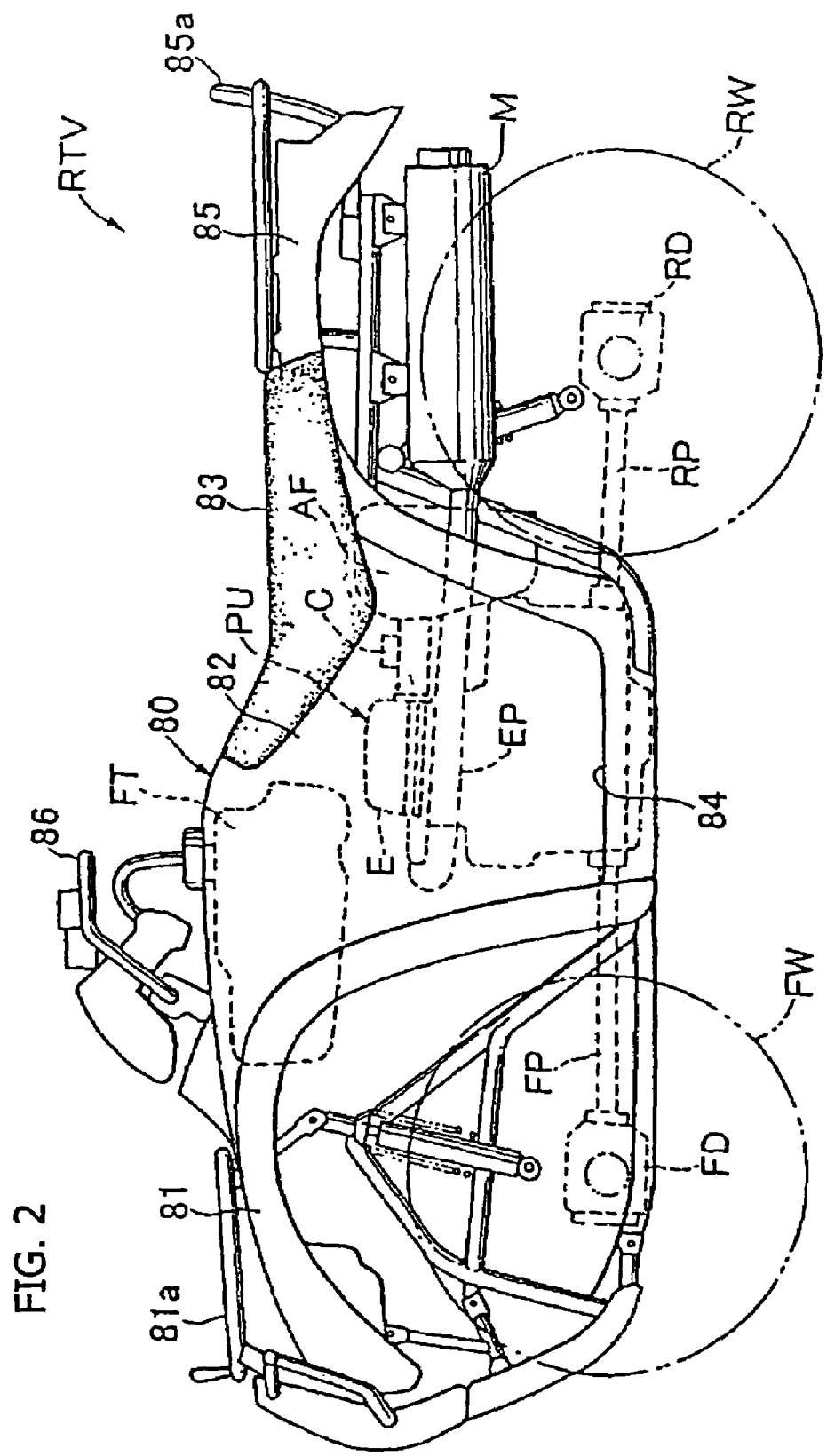
FIG. 2 is a side elevational view of a rough terrain vehicle including the above hydraulic continuously variable transmission according to the illustrative embodiment of the present invention.
Figure 3:
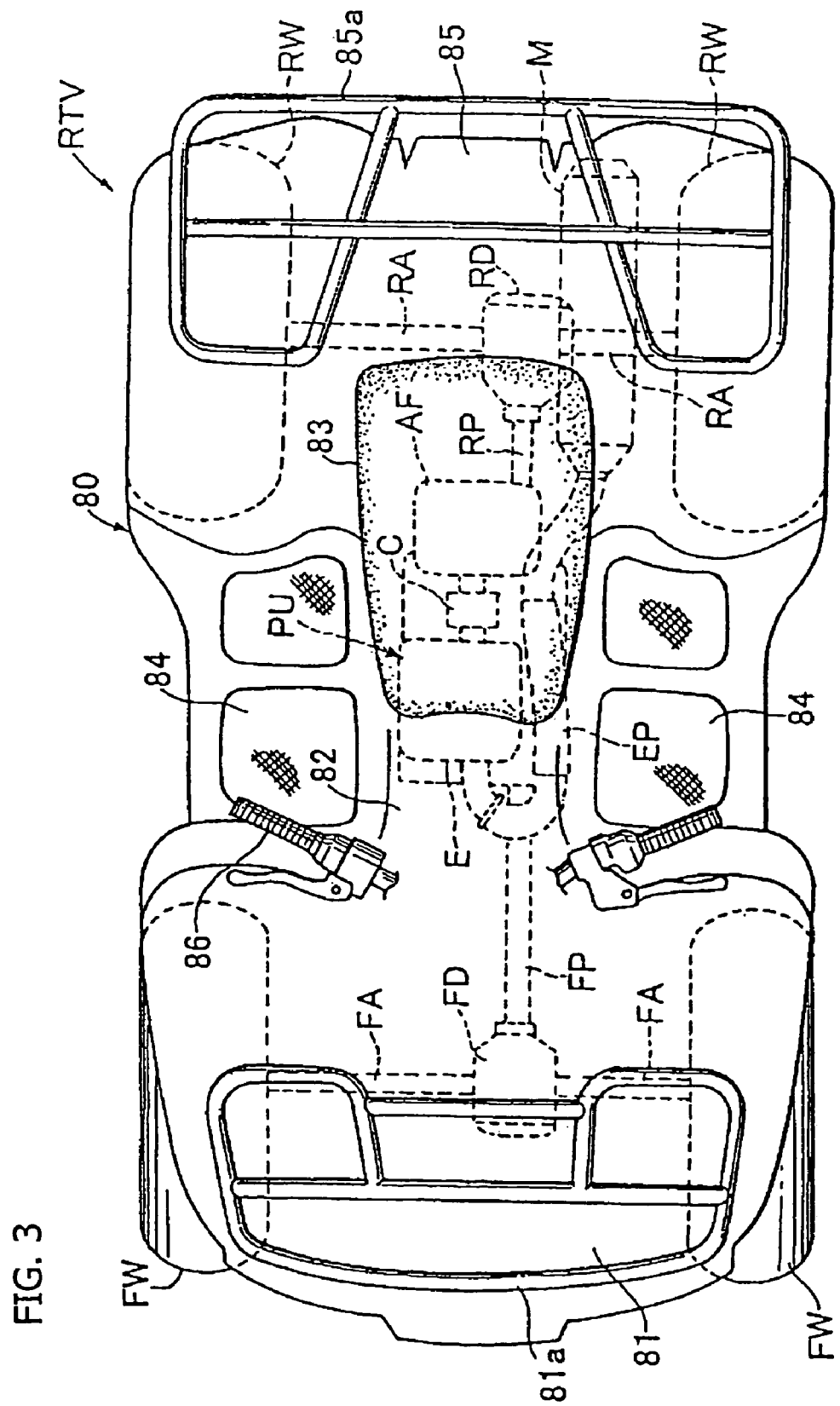
FIG. 3 is a top plan view of the rough terrain vehicle including the hydraulic continuously variable transmission according to the illustrative embodiment of the present invention.
Figure 4:
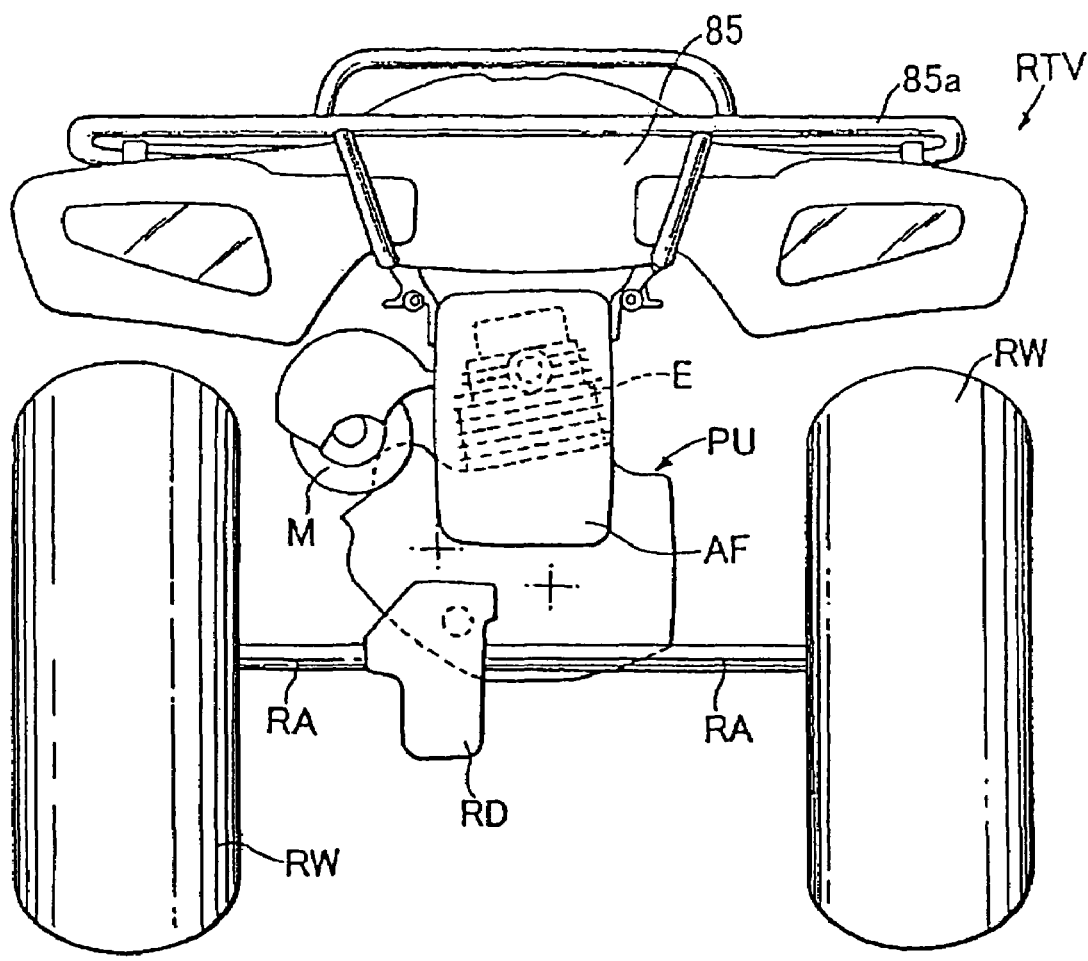
FIG. 4 is a rear elevational view of the rough terrain vehicle including the hydraulic continuously variable transmission according to the illustrative embodiment of the present invention.

Now, a selected illustrative embodiment of the present invention will be described below, with reference to the drawings. First, FIGS. 2 to 4 show a rough terrain vehicle (RTV), including a hydraulic continuously variable transmission (CVT) according to the present invention. The vehicle RTV includes a powertrain unit (PU) incorporated in a vehicle body 80 having a frame structure therein. The vehicle RTV also includes left and right front and rear wheels FW and RW, driven upon receiving the output of the powertrain unit PU.

Figure 1:
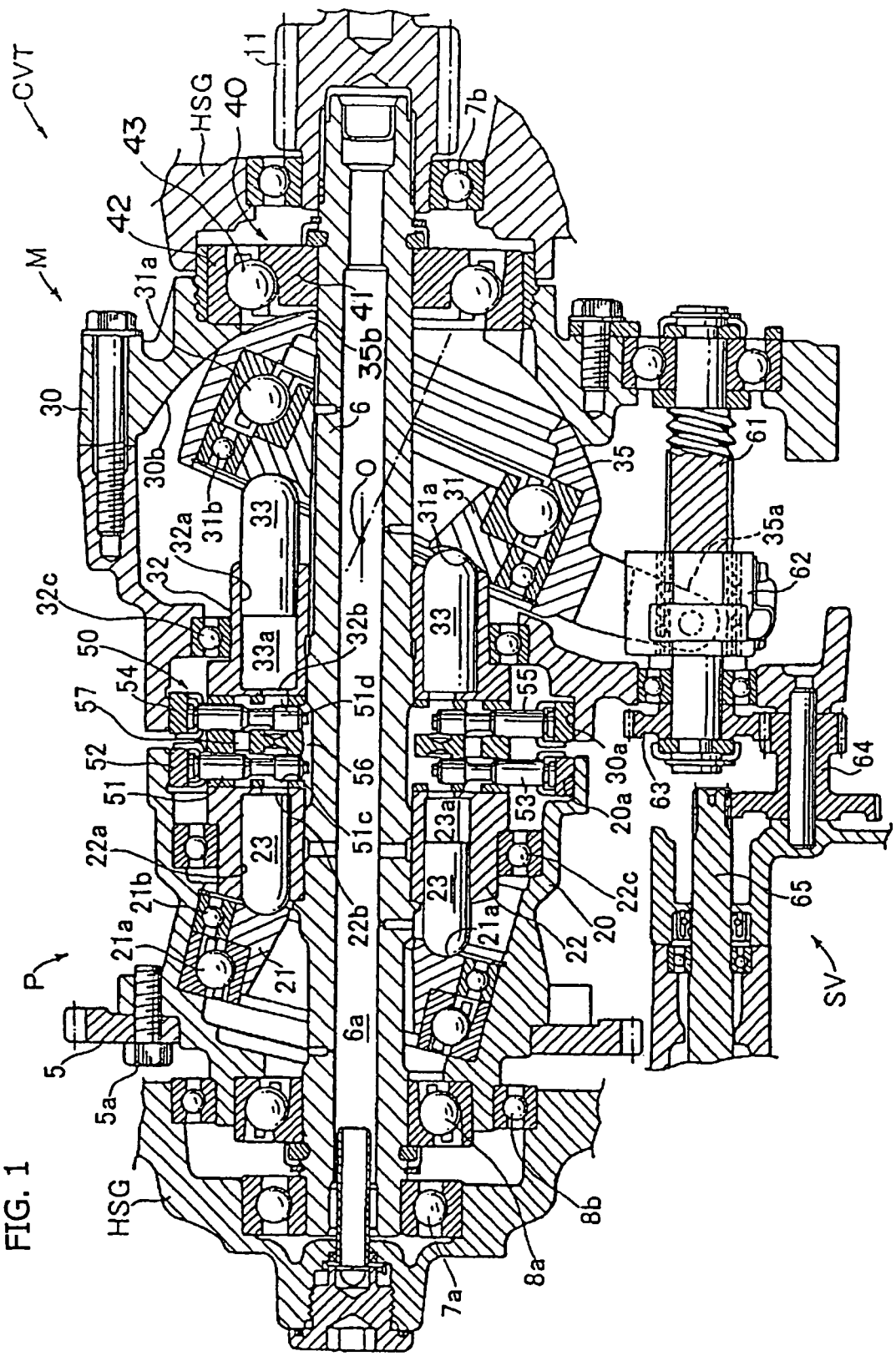
FIG. 1 is a sectional view, taken along a horizontal plane, of a hydraulic continuously variable transmission according to a selected illustrative embodiment of the present invention.

In addition, the vehicle body 80 includes a front fender portion 81 including a front guard 81a and located at a vehicle body front portion, a saddle portion 82 raised upwardly and extending in the front-rear direction at a vehicle body central portion, and left and right step portions 84, 84 extending in the left-right direction at left and right lower portions of the saddle portion 82. The saddle portion 82 is provided with a seat 83 for seating a driver thereon. In addition, a fuel tank FT is disposed on the front side of the saddle portion 82, as shown in FIG. 1.

The vehicle body 80 further includes a rear fender portion 85, located at a vehicle body rear portion and including a rear guard 85a.

The driver, seated on the seat 83 astride the saddle portion 82, puts his or her feet on the left and right step portions 84, and turns a steering handle 86 located on the front side and being pivotally movable to the left and right sides.

The powertrain unit PU is disposed below and inside the saddle portion 82, and the powertrain unit PU includes an engine E, a main clutch CL, a hydraulic continuously variable transmission CVT, and a transmission gear train GT, as will be described later.

The engine E is so constituted that a mixture gas formed by mixing air taken in through an air filter AF and a fuel fed from the fuel tank FT with each other in a carburetor C is taken into a cylinder and is combusted in the cylinder to thereby generate a rotational drive force. In addition, an exhaust gas discharged upon the combustion in the engine E is discharged through an exhaust pipe EP and a muffler M.

The rotational drive force of the engine E is transmitted from a crankshaft with a speed change through the main clutch CL, the hydraulic continuously variable transmission CVT and the transmission gear train GT, and is output to front and rear propeller shafts FP and RP.

The front propeller shaft FP is connected to a front differential mechanism FD, and the rotational drive force output to the front propeller shaft FP is transmitted from the front differential mechanism FD to the left and right front wheels FW through left and right front axle shafts FA, to drive the front wheels FW.

The rear propeller shaft RP is connected to a rear differential mechanism RD, and the rotational drive force output to the rear propeller shaft RP is transmitted from the rear differential mechanism RD to the left and right rear wheels RW through left and right rear axle shafts RA, to drive the rear wheels RW.

Figure 5:
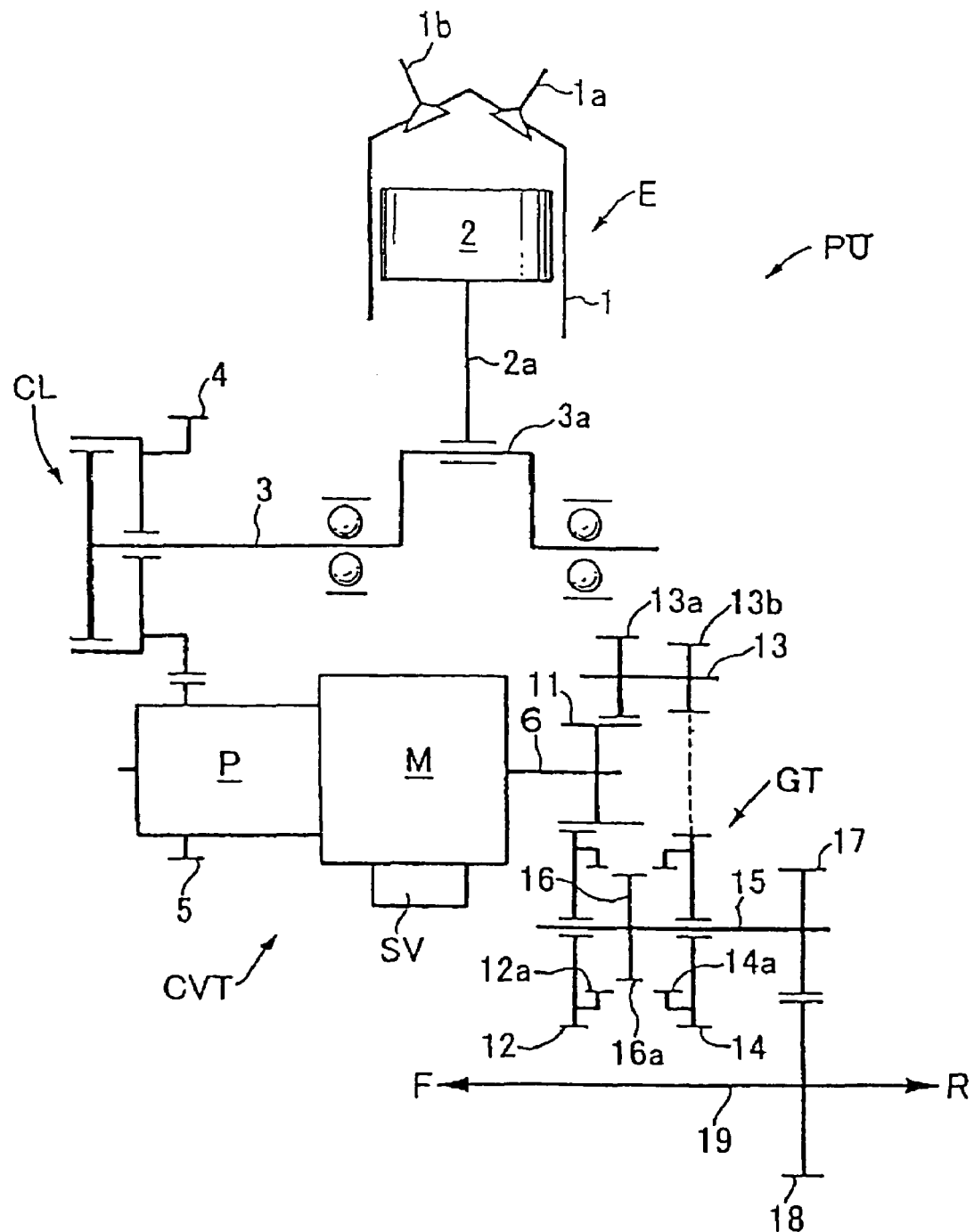
FIG. 5 is a schematic diagram showing the constitution of power transmission paths in a powertrain unit including the hydraulic continuously variable transmission according to the illustrative embodiment of the present invention according to the illustrative embodiment of the present invention.

The powertrain unit PU will be described referring to FIG. 5. The powertrain unit PU includes the engine E for generating the rotational drive force, the main clutch CL for controlling the transmission of the rotational drive force, the hydraulic continuously variable transmission CVT for stepless speed change of the rotational drive force transmitted through the main clutch CL, and the transmission gear train GT for direction changeover and transmission of the output rotation of the hydraulic continuously variable transmission CVT. In addition, the powertrain unit PU is disposed in the inside of the saddle portion 82, with the engine crankshaft extending in the front-rear direction of the vehicle.

The engine E includes a piston 2 disposed in a cylinder 1 provided with intake and exhaust valves 1a and 1b in a head portion thereof. In the engine E, as mentioned above, air taken in through the air filter AF and the fuel fed from the fuel tank FT are mixed with each other in the carburetor C to form the mixture gas, which is sucked into a cylinder chamber by opening the intake valve 1a at a predetermined timing, and is burned in the cylinder chamber to thereby reciprocate the piston 2.

The reciprocating motion of the piston 2 is transmitted through a connecting rod 2a to a crank portion 3a, whereby a crankshaft 3 is driven to rotate. The main clutch CL is provided at an end portion of the crankshaft 3, to control the engagement and disengagement between an input drive gear 4, rotatably disposed on the crankshaft 3 and the crankshaft 3. Therefore, the rotational drive force of the crankshaft 3 is transmitted to the input drive gear 4 according to the engagement/disengagement control by the main clutch CL. The main clutch CL may, for example, be a centrifugal clutch.

The hydraulic continuously variable transmission CVT includes a hydraulic swash plate plunger pump P and a hydraulic swash plate plunger motor M. An input driven gear 5, connected to a pump casing of the hydraulic swash plate plunger pump P is meshed with the input drive gear 4, and the rotational drive force of the engine E is transmitted to the input driven gear 5, whereby the pump casing is rotated.

While details of the hydraulic continuously variable transmission CVT will be described later, the output rotation, obtained through stepless speed change by the hydraulic continuously variable transmission CVT, is output via a transmission output shaft 6.

A transmission output gear 11, of the transmission gear train GT, is connected to the transmission output shaft 6, and the rotation of the transmission output shaft 6 is transmitted from the transmission output gear 11 through the transmission gear train GT. The transmission gear train GT includes a counter shaft 5 and an idler shaft 13 which are disposed in parallel to the transmission output shaft 6.

On the counter shaft 15, a forward-running gear 12 and a rearward-running gear 14 are rotatably disposed, and operatively connected to an output drive gear 17. On the other hand, a first idler gear 13a and a second idler gear 13b are disposed in a connected state on the idler shaft 13. The forward-running gear 12 is meshed with the transmission output gear 11, and the first idler gear 13a is also meshed with the transmission output gear 11. In addition, the second idler gear 13b is meshed with the rearward-running gear 14.

The forward-running gear 12 and the rearward-running gear 14 are provided respectively with internal clutch gears 12a and 14a, and a clutch sleeve 16 rotatable as one body with the counter shaft 15 and movable in the axial direction is provided between the forward-running gear 12 and the rearward-running gear 14. The clutch sleeve 16 is provided with an external clutch gear 16a at the outer circumference thereof, and is so structured that the clutch sleeve 16 can be moved in the axial direction to selectively mesh with the internal clutch gears 12a and 14a, whereby a dog-tooth clutch is constituted. In addition, the driver moves the clutch sleeve 16 in the axial direction according to shift lever operations to the forward running side and the rearward running side.

When the driver moves a shift lever to the forward running side, the clutch sleeve 16 is moved leftwards in the figure, the external clutch gear 16a is meshed with the internal clutch gear 12a, and the forward-running gear 12 is connected to the counter shaft 15. In this condition, therefore, the rotation of the transmission output gear 11 is transmitted from the forward-running gear 12 to the counter shaft 15, whereby the output drive gear 17 is driven to rotate.

On the other hand, when the driver moves the shift lever to the rearward running side, the clutch sleeve 16 is moved rightwards in the figure, the external clutch gear 16a is meshed with the internal clutch gear 14a, and the rearward-running gear 14 is connected to the counter shaft 15.

In this condition, the rotation of the transmission output gear 11 is transmitted from the first idler gear 13a to the second idler gear 13b through the idler shaft 13, and is further transmitted from the second idler gear 13b to the counter shaft 15 through the rearward-running gear 14 meshed with the second idler gear 13b, whereby the output drive gear 17 is driven to rotate. In addition, the rotating direction of the output drive gear 17 in this instance is in the reverse direction (rearward-running direction) relative to that in the case of the shift lever operation to the forward running side.

The output drive gear 17 is meshed with an output driven gear 18 connected and attached to a drive shaft 19, so that the rotation of the output drive gear 17 is transmitted to the drive shaft 19 through the output driven gear 18. The front end of the drive shaft 19 is connected to the front propeller shaft FP, while the rear end of the drive shaft 19 is connected to the rear propeller shaft RP, and the rotational drive force transmitted to the drive shaft 19 is transmitted to the front and rear propeller shafts FP and RP, whereby the front and rear wheels FW and RW are driven, as mentioned above.

Next, the hydraulic continuously variable transmission CVT will be described referring to FIG. 1 and FIGS. 6 to 8. The hydraulic continuously variable transmission CVT includes the hydraulic swash plate plunger pump P and the hydraulic swash plate plunger motor M, with the transmission output shaft 6 disposed to extend through the center thereof. In addition, the transmission output shaft 6 is rotatably supported in a transmission housing HSG by ball bearings 7a and 7b.

The Hydraulic Pump

The hydraulic pump P includes a pump casing 20 coaxially disposed on the transmission output shaft 6 and concurrently rotatable therewith. The pump P also includes a pump swash plate member 21, disposed inside the pump casing 20 and inclined at a predetermined angle to the rotational center axis of the pump casing 20.

The pump P also includes a pump cylinder 22 disposed opposite the pump swash plate member 21, and a plurality of pump plungers 23 slidably disposed in a plurality of pump plunger holes 22a in the pump cylinder 22. The pump plunger holes 22a extend in the axial direction in an annular pattern, parallel to and surrounding the center axis of the pump cylinder 22.

The pump casing 20 is rotatably supported on the transmission output shaft 6 through a bearing 8a, and is supported by a bearing 8b to be rotatable relative to the transmission housing HSG. The pump swash plate member 21 is supported by bearings 21a and 21b to be rotatable about an axis inclined at the predetermined angle relative to the pump casing 20. The pump cylinder 22 is supported by a bearing 22c, to be coaxial with and rotatable relative to the pump casing 20.

The input driven gear 5 is attached to the outer circumference of the pump casing 20 by bolts 5a. In addition, an outside end portion of each of the plungers 23 extends outwardly from the cylinder 22, to abuttingly contact and engage a swash plate surface 21a of the pump swash plate member 21. An inside end portion of each of the plungers 23, located in the pump plunger hole 22a, is opposed to a valve body 51 in a distribution valve 50 which will be described later, thereby forming a pump oil chamber 23a in the pump plunger hole 22a. In addition, pump openings 22b are provided, at end portions of the pump plunger holes 22a, to function as pump discharge and suction ports.

When the input driven gear 5 is rotated as mentioned above, the pump casing 20 is driven to rotate, and the pump swash plate member 21, disposed in the inside of the pump casing 20, is oscillated attendant on the rotation of the pump casing 20.

The pump plungers 23 are sequentially reciprocated in the pump plunger holes 22a according to the oscillational movement of the swash plate surface 21a, to alternately apply compressive and expansive forces to a hydraulic fluid in the pump oil chambers 23a.

The Hydraulic Motor

The hydraulic motor M includes a motor casing 30, connected to and firmly held on the transmission housing HSG. The hydraulic motor M also includes a motor pivot member 35, which is supported through sliding contact with a concave hemispherical support surface 30b formed inside of the motor casing 30. The motor pivot member 35 is supported to be pivotally movable about a pivot axis O, extending in a perpendicular direction (in the direction perpendicular to the paper surface) relative to the center axis of the transmission output shaft 6. The hydraulic motor M also includes a motor swash plate member 31, rotatably supported inside the motor pivot member 35 by bearings 31a and 31b.

In addition, the motor pump M includes a motor cylinder 32 adjacent the motor swash plate member 31. The motor cylinder 32 is rotatably supported on the motor casing 30 through a bearing 32c, at an outer circumferential portion thereof.

The motor pump M further includes a plurality of motor plungers 33 slidably disposed in a plurality of motor plunger holes 32a formed to extend in the axial direction in an annular layout surrounding and parallel to the center axis of the motor cylinder 32.

An outside end portion of each of the motor plungers 33 extends outwardly from the motor cylinder 32, to abuttingly contact and engage a swash plate surface 31a of the motor swash plate member 31. An inside end portion of each of the motor plungers 33, located in the plunger hole 32a, is opposed to the valve body 51, thereby forming a motor oil chamber 33a in the motor plunger hole 32a.

In addition, motor openings 32b are formed at end portions of the motor plunger holes 32a to function as motor discharge and suction ports.

An arm portion 35a, formed by extending an end portion of the motor pivot member 35 toward the outer diameter side, extends radially outwardly and upwardly to be connected to a motor servo mechanism SV. The motor servo mechanism SV functions as a control for moving the arm portion 35a in the left-right direction in the figure, and also as a control for pivoting the motor pivot member 35 about the pivot axis O.

When the motor pivot member 35 is thus moved, the motor swash plate member 31, rotatably supported inside the motor pivot member 35, is also moved concurrently with the motor pivot member 35, with the result of a change in the swash plate angle.

The Distribution Valve

The distribution valve 50 is disposed between the pump cylinder 22 and the motor cylinder 32. The valve body 51 of the distribution valve 50 is clamped between the pump cylinder 22 and the motor cylinder 32 to achieve integral connection, and is also connected to the transmission output shaft 6. Therefore, the pump cylinder 22, the distribution valve 50, the motor cylinder 32, and the transmission output shaft 6 are rotated as one body.

Figure 7:
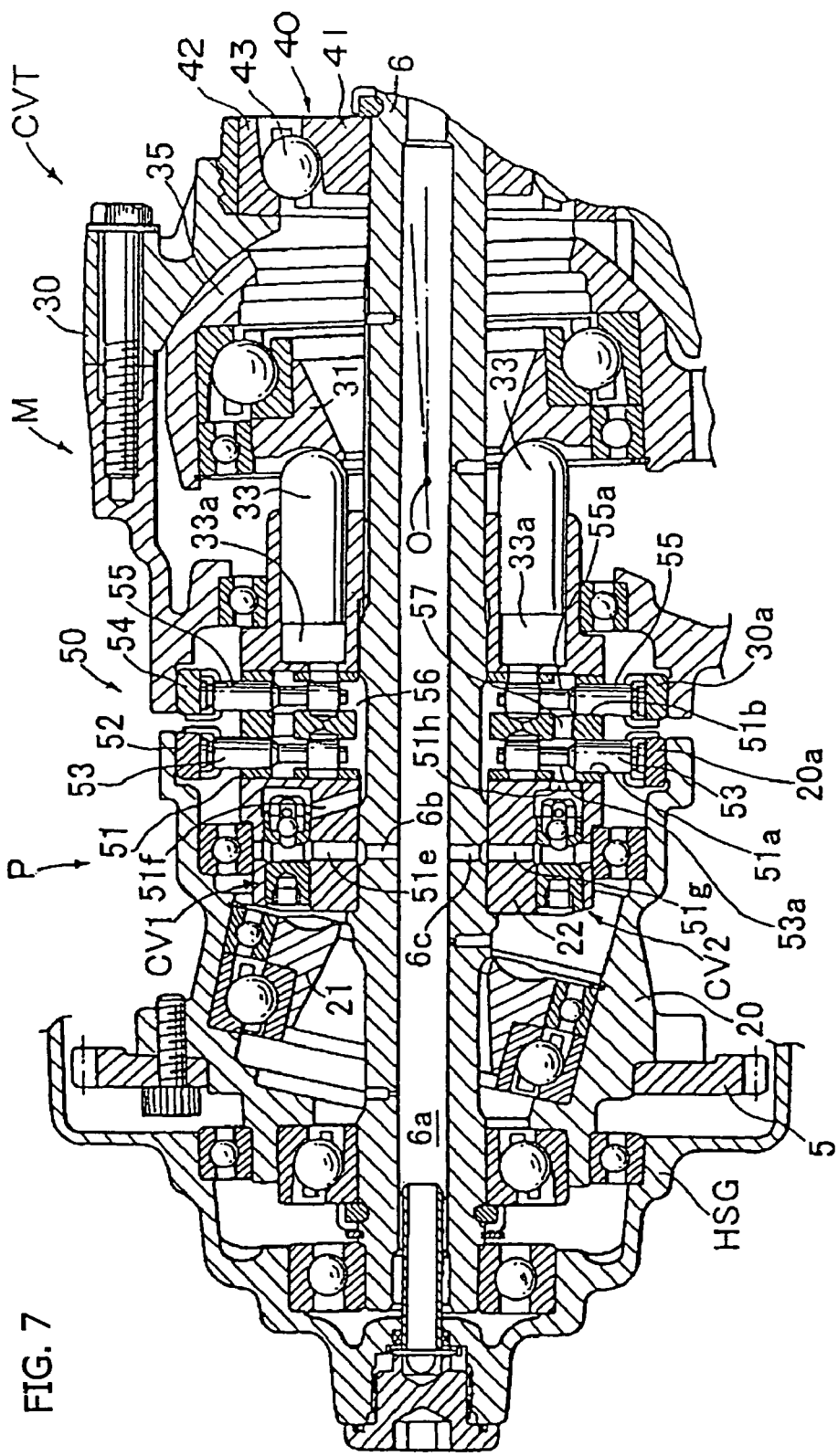
FIG. 7 is a sectional view of the hydraulic continuously variable transmission according to the illustrative embodiment of the present invention according to the illustrative embodiment of the present invention.

As symbols clearly shown particularly in FIG. 7, a plurality of pump-side spool holes 51a and a plurality of motor-side spool holes 51b extending in the radial directions and laid out at regular intervals along the circumferential direction are provided, in two rows, in the valve body 51 of the distribution valve 50. Pump-side spools 53 are slidably disposed in the pump-side spool holes 51a, and motor-side spools 55 are slidably disposed in the motor-side spool holes 51b.

The pump-side spool holes 51a are formed in correspondence with the pump plunger holes 22a, and the valve body 51 is provided with a plurality of pump-side communication passages 51c for communication between the corresponding pairs of the pump openings 22b (the pump oil chambers 23a) and the pump-side spool holes 51a. The motor-side spool holes 51b are formed in correspondence with the motor plunger holes 32a, and the valve body 51 is provided with a plurality of motor-side communication passages 51d for communication between the corresponding pairs of the motor openings 32b (the motor oil chambers 33a) and the motor-side spool holes 51b (see FIG. 1).

In the distribution valve 50, further, a pump-side cam ring 52 is disposed at a position surrounding the outer circumferential end portions of the pump-side spools 53, and a motor-side cam ring 54 is disposed at a position surrounding the outer circumferential end portion of the motor-side spools 55. The pump-side cam ring 52 is mounted inside an eccentric inner circumferential surface 20a formed on the tip end inside surface of the pump casing 20 with an eccentricity from the rotational center axis of the pump casing 20, and is rotated as one body with the pump casing 20. The motor-side cam ring 54 is mounted inside an eccentric inner circumferential surface 30a formed on the tip end inside surface of the motor casing 30 with an eccentricity from the rotational center axis of the motor cylinder 32. In addition, the outer circumferential ends of the pump-side spools 53 are relatively rotatably engaged and stopped on the inner circumferential surface of the pump-side cam ring 52, and the outer circumferential ends of the motor-side spools 55 are relatively rotatably engaged and stopped on the inner circumferential surface of the motor-side cam ring 54.

An inside passage 56 is formed between the inner circumferential surface of the valve body 51 and the outer circumferential surface of the transmission output shaft 6, and inner circumferential end portions of the pump-side spool holes 51a and the motor-side spool holes 51b are communicated with the inside passage 56. In addition, the valve body 51 is provided therein with an outside passage 57 for communication between the pump-side spool holes 51a and the motor-side spool holes 5ib.

Here, the operations of the distribution valve 50 constituted as above will be described. When the drive force of the engine E is transmitted to the input driven gear 5 and the pump casing 20 is driven to rotate, the pump swash plate member 21 is oscillated according to the rotation. Therefore, the pump plungers 23 in contact and engagement with the swash plate surface 21a of the pump swash plate member 21 are reciprocated in the axial direction in the pump plunger holes 22a, the hydraulic fluid is discharged from the pump oil chambers 23a through the pump openings 22b according to the inward movements of the pump plungers 23, and the hydraulic fluid is sucked into the pump chambers 23a through the pump openings 22b according to the outward movements of the pump plungers 23.

In this instance, the pump-side cam ring 52 attached to an end portion of the pump casing 20 is rotated together with the pump casing 20, and, since the pump-side cam ring 52 is mounted with an eccentricity relative to the rotational center of the pump casing 20, the pump-side spools 53 are reciprocated in the radial direction inside the pump-side spool holes 51*a* according to the rotation of the pump-side cam ring 52. In the reciprocation of the pump-side spools 53, when the pump-side spool 53 is moved toward the inner diameter side as shown in the upper half of FIG. 1, the pump-side communication passage 51*c* and the outside passage 57 are communicated with each other through a spool groove 53*a*; on the other hand, when the pump-side spool 53 is moved toward the outer diameter side as shown in the lower half of FIG. 1, the pump-side passage 51*c* and the inside passage 56 are communicated with each other through the spool groove 53*a*.

Here, the eccentric mount position is so set that, when the swash plate member 21 is oscillated by the rotation of the pump casing 20, and the pump plungers 23 are thereby reciprocated, in a half-rotation of the pump casing 20 in which the pump plunger 23 is moved from a most pushed-outward position (referred to as the bottom dead center) to a most pushed-inward position (referred to as the top dead center), the pump-side cam ring 52 moves the pump-side spool 53 toward the inner diameter side, and, in a half-rotation of the pump casing 20 in which the pump plunger 23 is moved from the top dead center to the bottom dead center, the pump-side cam ring 52 moves the pump-side spool 53 toward the outer diameter side.

As a result, when the pump plunger 23 is moved from the bottom dead center to the top dead center attendant on the rotation of the pump casing 20 and the hydraulic fluid in the pump oil chamber 23*a* is thereby discharged through the pump opening 22*b*, the hydraulic fluid is fed out through the pump-side communication passage 51*c* into the outside passage 57. On the other hand, when the pump plunger 23 is moved from the top dead center to the bottom dead center attendant on the rotation of the pump casing 20, the hydraulic fluid in the inside passage 56 is sucked into the pump oil chamber 23*a* through the pump-side communication passage 51*c* and the pump opening 22*b*. As seen from this, when the pump casing 20 is driven to rotate, the hydraulic fluid discharged from the hydraulic pump P is supplied into the outside passage 57, and the hydraulic fluid is sucked from the inside passage 56 into the hydraulic pump P.

On the other hand, the motor-side cam ring 54 attached to an end portion of the motor casing 30 is also mounted with an eccentricity relative to the rotational center of the motor casing 30, so that, when the motor cylinder 32 is rotated, the motor-side spools 55 are reciprocated in the radial direction inside the motor-side spool holes 51*b* according to the rotation.

In the reciprocation of the motor-side spools 55, when the motor-side spool 55 is moved toward the inner diameter side as shown in the upper half of FIG. 1, the motor-side communication passage 51*d* and the outside passage 57 are communicated with each other through a spool groove 55*a*; on the other hand, when the motor-side spool 55 is moved toward the outer diameter side as shown in the lower half of FIG. 1, the motor-side passage 51*d* and the inside passage 56 are communicated with each other through a spool groove 55*a*.

Here, as has been described above, the hydraulic fluid discharged from the hydraulic pump P is fed into the outside passage 57, and the hydraulic fluid is supplied from the motor-side communication passage 51*d* into the motor oil chambers 33*a* through the motor openings 32*b*, whereby the motor plungers 33 are pushed outwards in the axial direction.

Outside end portions of the motor plungers 33, thus receiving the axially outward pushing forces, are in sliding contact with the portion ranging from the top dead center to the bottom dead center of the motor swash plate member 31 in the condition where the motor pivot member 35 is pivotally moved as shown in FIG. 1, and the motor cylinder 32 is driven to rotate so that the motor plungers 33 are each moved along the motor swash plate member 31 from the top dead center to the bottom dead center by the axially outward pushing force.

In order to achieve such a rotational driving, the eccentric mount position of the motor-side cam ring 54 is set so that, when the motor plungers 33 are each reciprocated along the inclination of the motor swash plate member 31, attendant on the rotation of the motor cylinder 32, in a half-rotation of the motor cylinder 32 in which the motor plunger 33 is moved from a most pushed-outward position (bottom dead center) to a most pushed-inward position (top dead center), the motor-side cam ring 54 moves the motor-side spool 55 toward the outer diameter side.

In another half-rotation of the motor cylinder 32, in which the motor plunger 33 is moved from the top dead center to the bottom dead center, the motor-side cam ring 54 moves the motor-side spool 55 toward the outer diameter side.

When the motor cylinder 32 is thus driven to rotate, the motor plunger 33 is pushed and moved inwards when moving along the motor swash plate member 31 from the bottom dead center to the top dead center, whereby the hydraulic fluid in the motor oil chamber 33*a* is fed from the motor opening 32*b* into the inside passage 56 through the motor-side communication passage 51*d*. The hydraulic fluid thus fed into the inside passage 56 is sucked into the pump oil chamber 23*a* through the pump-side communication passage 51*c* and the pump opening 22*b*.

As is seen from the above description, when the pump casing 20 is driven to rotate by receiving the rotational drive force of the engine E, the hydraulic fluid is discharged from the hydraulic pump P into the outside passage 57, and is fed to the hydraulic motor M, to drive the motor cylinder 32 to rotate.

The hydraulic fluid, having driven the motor cylinder 32 to rotate, is fed into the inside passage 56, and is sucked from the inside passage 56 into the hydraulic pump P. Thus, the closed hydraulic circuit for connecting the hydraulic pump P and the hydraulic motor M to each other includes the distribution valve 50. The hydraulic fluid discharged from the hydraulic pump P according to the rotation thereof, is fed through the closed hydraulic circuit to the hydraulic motor M, to drive the hydraulic motor M to rotate, and the hydraulic fluid discharged after driving the hydraulic motor M is returned through the closed hydraulic circuit to the hydraulic pump P.

In this case, since the pump cylinder 22 and the motor cylinder 32 are connected to the transmission output shaft 6 and are rotated as one body with the latter, when the motor cylinder 32 is driven to rotate as above-mentioned, the pump cylinder 22 is also rotated together, and the relative rotating speed of the pump casing 20 and the pump cylinder 22 is reduced.

Therefore, the relationship between the rotating speed Ni of the pump casing 20 and the rotating speed No of the transmission output shaft 6 (namely, the rotating speed of the pump cylinder 22 and the motor cylinder 32) is as represented by the following equation (1) in relation to the pump volume Vp and the motor volume Vm.

$$Vp \cdot (Ni - No) = Vm \cdot No \quad \text{Equation 1}$$

The motor volume Vm can be steplessly varied by a control for pivotally adjusting the motor pivot member 35 by the motor servo mechanism SV. Therefore, when it is assumed that the rotating speed Ni of the pump swash plate member 21 in the above equation (1) is constant, a control for steplessly varying the motor volume Vm causes a speed change control for a stepless speed change of the rotation of the transmission output shaft 6.

When a control for reducing the pivot angle of the motor pivot member 35 is performed, the motor volume Vm is reduced, and, when it is assumed that the pump volume Vp is constant and the rotating speed Ni of the pump swash plate member 21 is constant in the relationship of the above equation (1), there results a control for an increase in speed for causing the rotation of the transmission output shaft 6 to approach the rotating speed Ni of the pump swash plate member 21, i.e., a stepless speed change control to a top speed change stage.

At the time when the motor swash plate angle becomes zero, i.e., when the motor swash plate becomes upright, a speed change ratio of Ni=No (top speed change ratio) is theoretically attained, and a hydraulic lock condition results in which the pump casing 20 is rotated as one body with the pump cylinder 22, the motor cylinder 32 and the transmission output shaft 6, to achieve a mechanical power transmission.

Figure 6:
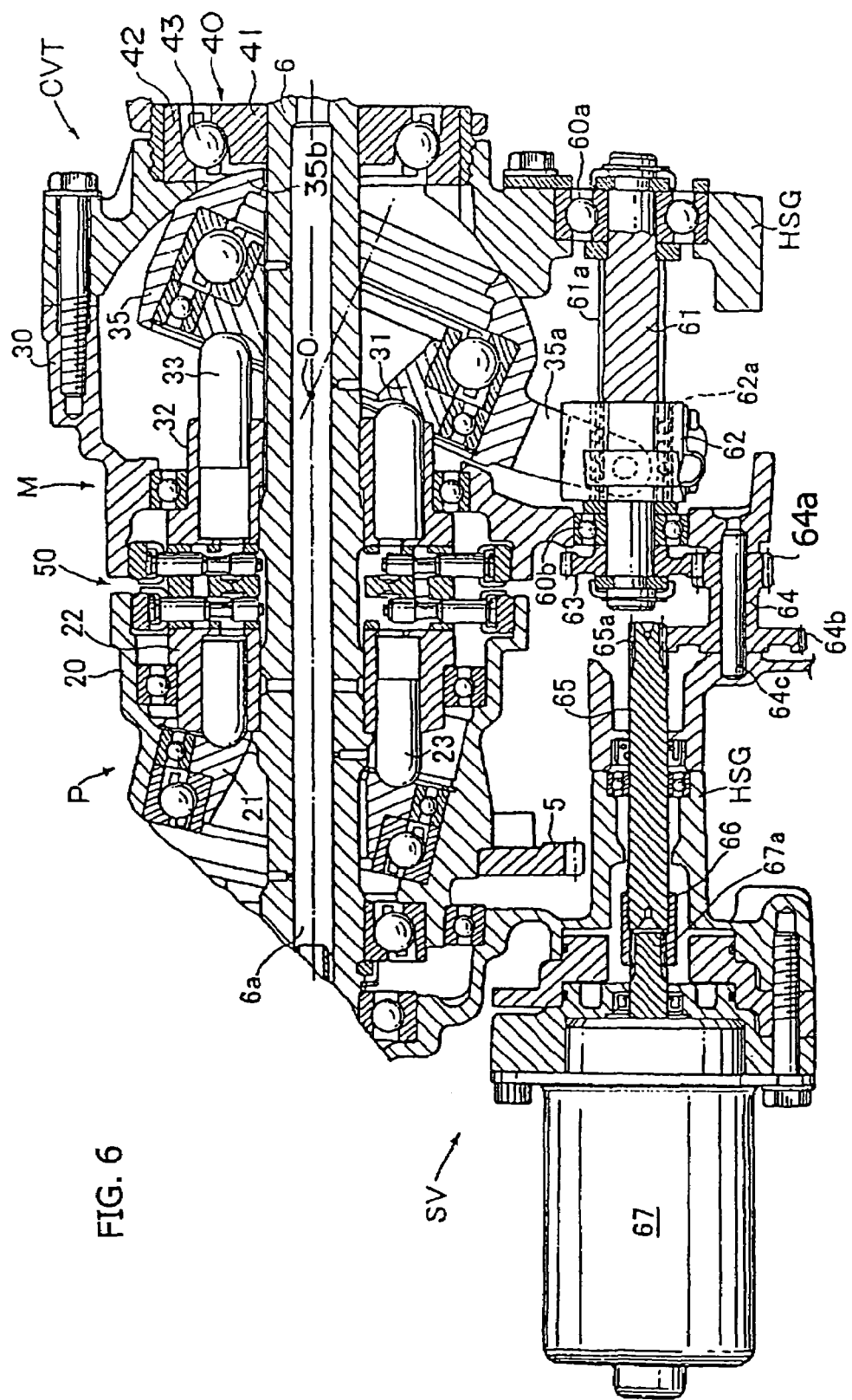
FIG. 6 is a sectional view, taken along a horizontal plane, of the hydraulic continuously variable transmission according to the illustrative embodiment of the present invention according to the illustrative embodiment of the present invention.

While the control for steplessly varying the motor volume as above-mentioned is performed by a variable control of the motor swash plate angle through pivotally adjusting the motor pivot member 35, the motor servo mechanism SV for pivotally adjusting the motor pivot member 35 in this manner will be described below, referring principally to FIG. 6.

The motor servo mechanism SV includes a ball screw shaft 61 located in the vicinity of the arm portion 35a of the motor pivot member 35, extending in parallel to the transmission output shaft 6 and supported by bearings 60a and 60b to be rotatable relative to the transmission housing HSG, and a ball nut 62 disposed in screw engagement with a male screw 61a formed at the outer circumference of the ball screw shaft 61.

In addition, a ball female screw 62a, composed of a multiplicity of balls held arranged in a screw form by a cage, is provided at the inner circumference of the ball nut 62, and the male screw 61a is screw-engaged with the ball female screw 62a. The ball nut 62 is connected to the arm portion 35a of the motor pivot member 35, and, when the ball screw shaft 61 is driven to rotate, the ball nut 62 is moved in the left-right direction on the shaft 61, whereby the motor pivot member 35 is pivotally adjusted.

In order to drive the ball screw shaft 61 to rotate in this manner, a swash plate control motor (electric motor) 67 is attached to the outside surface of the transmission housing HSG. A drive shaft 67a of the swash plate control motor 67 is connected to a spacer shaft 65 through a coupling 66. The spacer shaft 65 extends inside the transmission housing HSG in parallel to the transmission output shaft 6, extends beyond the outer circumference of the input driven gear 5 to the vicinity of an end portion of the ball screw shaft 61, and is rotatably supported on the transmission housing HSG. On the other hand, an idle shaft 64c extending in parallel to the spacer shaft 65 is supported on the transmission housing HSG, and an idle gear member 64 is rotatably mounted on the idle shaft 64c.

The spacer shaft 65 is provided at its tip end with a first gear 65a, which is meshed with a second gear 64b integrally formed on the idle gear member 64. In addition, a third gear 64a integrally formed on the idle gear member 64 is meshed with a fourth gear 63 connected to an end portion of the ball screw shaft 61.

Therefore, when a rotational drive control of the swash plate control motor 67 is performed and the drive shaft 67a is thereby rotated, the rotation is transmitted through the idle gear member 64 to the fourth gear member 63, to drive the ball screw shaft 61 to rotate, whereby the ball nut 62 is moved on the shaft 61 in the left-right direction, and a control for pivotally adjusting the motor pivot member 35 is performed.

Thus, the rotation of the swash plate control motor 67 is transmitted through an idle gear train to the screw shaft 61, so that the transmission ratio can be freely varied and set by appropriately setting the gear ratios in the idle gear train.

As clearly seen from the figure, the swash plate control motor 67 is attached to the outside surface of the transmission housing HSG at a position on the left side (the hydraulic pump side) relative to the input driven gear 5.

Therefore, the swash plate control motor 67 can be disposed close to the center axis side of the transmission output shaft 6 to such an extent that the swash plate control motor 67 and the input driven gear 5 overlap partly with each other in side view, and it is possible to suppress the width of the hydraulic continuously variable transmission CVT and, hence, the width of the powertrain unit PU.

In this case, the spacer shaft 65 which is the smallest in radial size among the components of the motor servo mechanism SV is set to extend through the vicinity of the outer circumferential end of the input driven gear 5, so that the swash plate control motor 67 can be disposed closest to the center axis side of the transmission output shaft 6.

As has been described above, the powertrain unit PU is disposed inside and below the saddle portion 82 of the rough terrain vehicle RTV, and the driver is seated on the seat 83 astride the saddle portion 82.

Therefore, the problem that the width of the saddle portion 82 is enlarged, to make it difficult for the driver to be seated astride the saddle portion 82, can be obviated by reducing the width of the powertrain unit PU. In addition, since the saddle portion 82 covers a space extending in the front-rear direction of the vehicle, there is little restriction as to the size of the powertrain unit PU in the front-rear direction.

Therefore, as shown in this embodiment, the swash plate control motor 67 can be disposed on the front side relative to the hydraulic pump P and connected to the screw shaft through the spacer shaft. As a result, the swash plate control motor 67 can be axially spaced to the front side from lateral sides of the hydraulic pump P and the hydraulic motor M, thereby ensuring that the swash plate control motor 67 is less liable to be affected by the heat coming from the side of the hydraulic pump P and the hydraulic motor M.

Figure 9:
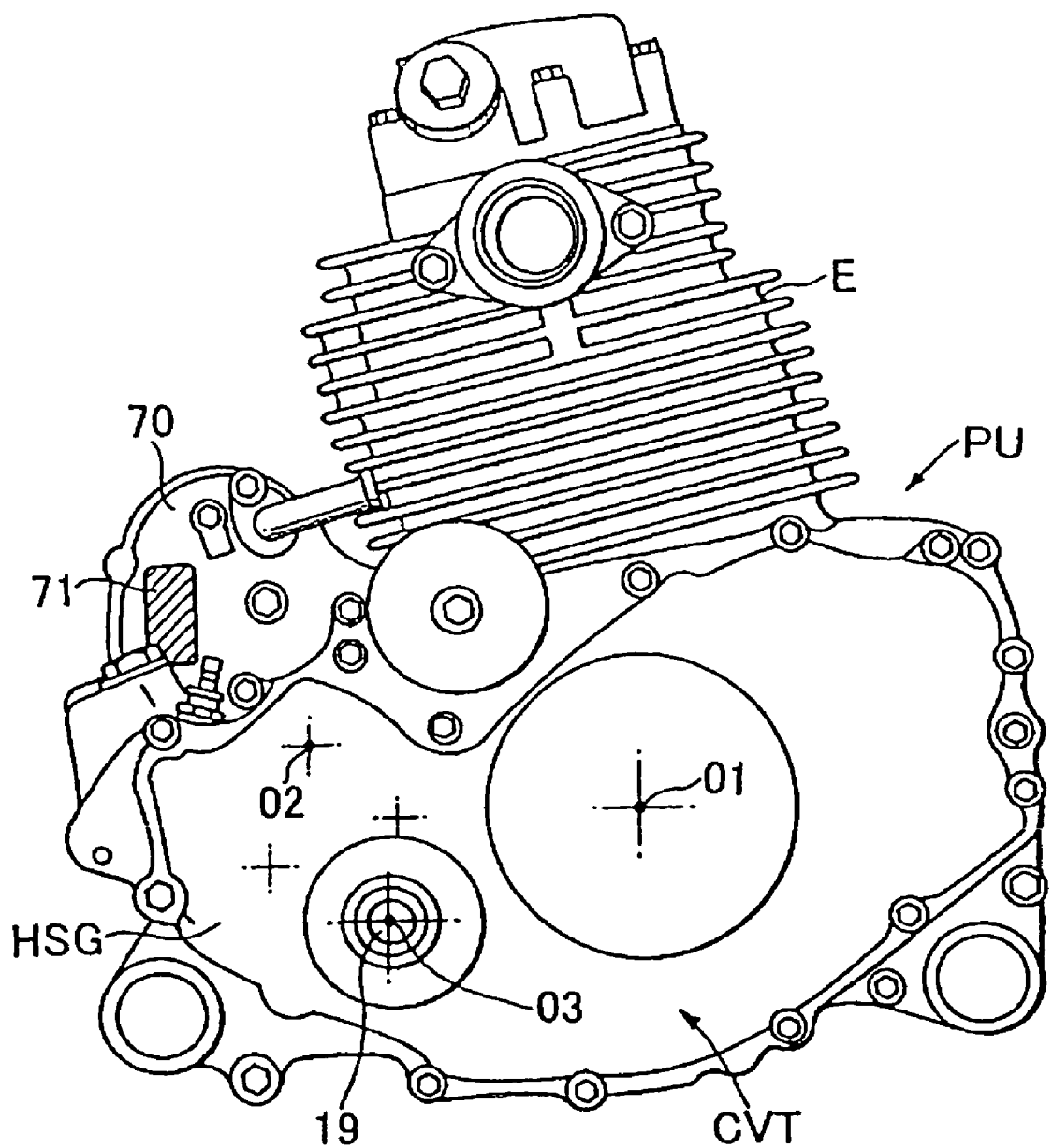
FIG. 9 is a rear plan view of the powertrain unit according to the illustrative embodiment of the present invention.

The powertrain unit PU as viewed from the rear side of the vehicle is shown in FIG. 9, in which the cylinder block of the engine E projects upwardly, the transmission housing HSG is connected to the lower side of the engine E, and selected components of the hydraulic continuously variable transmission CVT are disposed in the transmission housing HSG.

In FIG. 9, 01 denotes the position of the rotational center axis of the engine crankshaft, 02 denotes the position of the rotational center axis of the hydraulic continuously variable transmission CVT, and 03 denotes the position of the rotational center axis of the drive shaft 19, including the output driven gear 18.

The arm portion 35a (FIG. 6) extends outwardly and downwardly from the ball nut 62 of the swash plate adjustment mechanism, and is integrally connected to an end portion of the motor pivot member 35 of the hydraulic motor M, which is located on the rotational center axis O2. The motor servo mechanism SV is also located on the upper side of the transmission housing HSG, as shown in FIG. 9.

Therefore, the transmission housing HSG includes a base portion and an auxiliary portion 70, extending upwardly from the base portion and surrounding the arm portion 35a and the motor servo mechanism SV, which also extend upwardly.

The swash plate control motor 67 is mounted to a front surface (on the back side of FIG. 9) of the auxiliary portion 70, and a machined identification number display portion 71, shown hatched in FIG. 9, is provided on a rear-side side surface.

Identifying indicia such as an engine number, a powertrain unit number, a model number and/or the like are stamped on the identification number display portion 71.

Alternatively, a name plate with these numbers stamped thereon may be glued, fastened on, or otherwise adhered to the identification number display portion 71. Thus, the identification number display portion 71 is provided at a position where the identification numbers can be clearly viewed from the rear side of the transmission CVT, so that even in the condition where the powertrain unit PU is mounted on the vehicle, the identification marks in the identification number display portion 71 can be easily read by from the rear side of the vehicle.

Meanwhile, when the oil flows through the closed hydraulic circuit and the hydraulic force is transmitted between the hydraulic pump P and the hydraulic motor M as described above, there arise leakage of the oil from the closed hydraulic circuit and leakage of the oil from fitting portions between the pump and motor plunger holes 22a, 32a and the pump and motor plungers 23, 33. In view of this, the transmission output shaft 6 is provided with a charge oil supply hole 6a extending in the axial direction, and, as shown in FIG. 7, the charge oil supply hole 6a is connected to a first check valve CV1 disposed in the pump cylinder 22 through an oil passage 6b formed in the transmission output shaft 6 and an oil passage 51e formed in the pump cylinder 22, and connected further from the first check valve CV1 to the inside passage 56 through an oil passage 51f. Therefore, a charge oil supplied from a charge oil supply source (not shown) into the charge oil supply hole 6a is supplied through the first check valve CV1 into the inside passage 56, as required.

In addition, the charge oil supply hole 6a is connected to a second check valve CV2 disposed in the pump cylinder 22 through an oil passage 6c formed in the transmission output shaft 6 and an oil passage 51g formed in the pump cylinder 22, and is further connected from the second check valve CV2 to the outside passage 57 through an oil passage 51h. Therefore, the charge oil supplied into the charge oil supply hole 6a is supplied through the second check valve CV2 into the outside passage 57, as required.

As seen from the above description of the operations of the hydraulic pump P and the hydraulic motor M, in a normal running condition, i.e., in the condition where the hydraulic motor M is driven to rotate under the supply of the hydraulic fluid from the hydraulic pump P, a higher pressure is present in the outside passage 57 and a lower pressure is present in the inside passage 56, so that the charge oil is supplied into the inside passage 56 through the first check valve CV1. However, in the condition where the vehicle is running under an engine brake action, a lower pressure is present in the outside passage 57 and a higher pressure is present in the inside passage 56, so that the charge oil is supplied into the outside passage 57 through the second check valve CV2.

Figure 8:
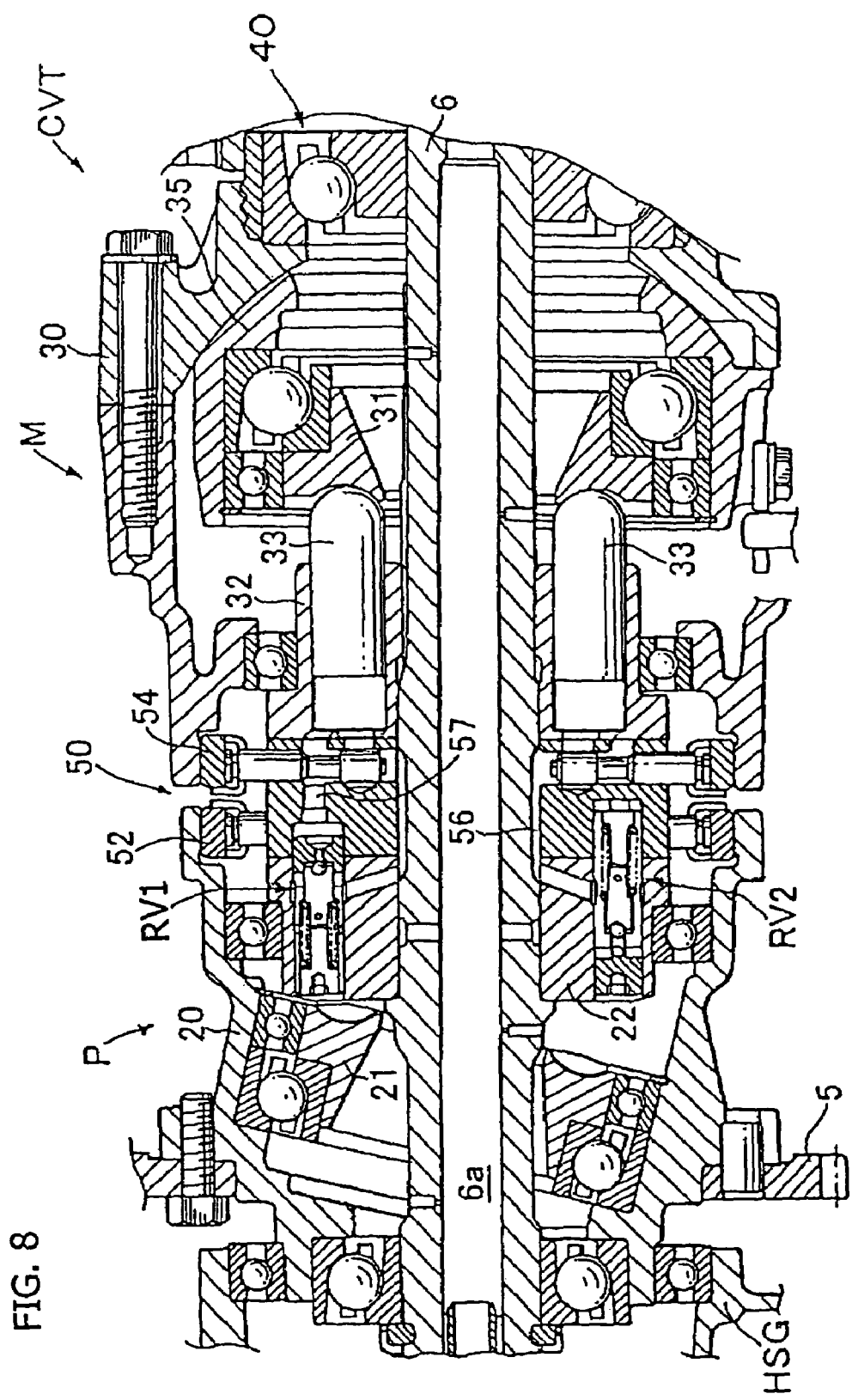
FIG. 8 is a sectional view of the hydraulic continuously variable transmission according to the illustrative embodiment of the present invention.

As shown in FIG. 8, first and second relief valves RV1 and RV2 are also disposed in the pump cylinder 22. First, the first relief valve RV1 is disposed in the state of connecting the outside passage 57 and the inside passage 56 to each other, and, when the oil pressure in the outside passage 57 reaches or exceeds a predetermined pressure, the first relief valve RV opens to relieve the oil pressure into the inside passage 56, thereby preventing the oil pressure in the outside passage 57 from becoming excessively high. The second relief valve RV2 is disposed in the state of connecting the inside passage 56 and the outside passage 57 to each other, and, when the oil pressure in the inside passage 56 reaches or exceeds a predetermined pressure, the second relief valve RV2 opens to relieve the oil pressure into the outside passage 57, thereby preventing the oil pressure in the inside passage 56 from becoming excessively high.

As has been described above, according to the present invention, the transmission housing is provided with the auxiliary portion for containing the swash plate adjustment mechanism in the state of extending upwardly, and, with the swash plate adjustment mechanism thus extended upwardly, the auxiliary portion surrounding the swash plate adjustment mechanism, of the transmission housing, extends upwardly, so that the side surface on the opposite side of the side surface for mounting the servo motor thereon, of the auxiliary portion, can be advantageously used as the identification mark display portion. Moreover, since the identification mark display portion is provided on the side surface of the auxiliary portion extending upwardly as above-mentioned, the identification mark can be easily viewed from the outside in the condition where the hydraulic continuously variable transmission is mounted on the vehicle.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications, which are within the scope of the claims, are intended to be within the scope and spirit of the present invention.

Having thus, described the invention, what is claimed is:

1. A hydraulic continuously variable transmission, comprising:

hollow transmission housing comprising a base portion and an auxiliary portion, the auxiliary portion for containing a swash plate adjustment mechanism, said auxiliary portion extending upwardly from the base portion of said housing;

swash plate plunger pump and a swash plate plunger motor disposed in said housing and operatively connected to each other through a closed hydraulic circuit;

an output shall rotatably supported on said housing and having an axis of rotation;

a movable swash plate, comprising one of said swash plate plunger pump and said swash plate plunger motor, said movable swash plate being pivotally movable about a pivot axis extending in a direction perpendicular to the axis of rotation of said output shaft; and said swash plate adjustment mechanism operably connected to said movable swash plate for use in positioning said movable swash plate, said swash plate adjustment mechanism comprising an actuator, the actuator positioned above and adjacent to an outer end of an other one of said swash plate plunger pump and said swash plate plunger motor such that the actuator does not overlie the swash plate plunger pump and swash plate plunger motor.

2. The hydraulic continuously variable transmission of claim 1, wherein a servo motor of said swash plate adjustment mechanism is attached to a side surface on a first side of said auxiliary portion, and an identification mark display portion is provided on a second side surface of said auxiliary portion, substantially opposite said first side.

3. The hydraulic continuously variable transmission of claim 1, wherein said motor swash plate comprises said pivotably movable swash plate, and further comprising a motor pivot member for supporting said motor swash plate, and a motor casing for supporting said motor pivot member.

4. The hydraulic continuously variable transmission of claim 3, wherein said motor casing has a concave hemispherical support socket formed therein, and wherein motor pivot member is pivotally supported through sliding contact with said support socket of said motor casing.

5. A hydraulic continuously variable transmission, comprising:
a hollow transmission housing, comprising a base portion and an auxiliary portion, the auxiliary portion for containing a swash plate adjustment mechanism, said auxiliary portion extending upwardly from the base portion of said housing;
a motor casing disposed within said transmission housing;
a motor pivot member supported by said motor casing;
a swash plate plunger pump disposed within said housing and comprising a pump swash plate and a pump cylinder;
a swash plate plunger motor rotatably supported on said motor pivot member and comprising a motor swash plate and a motor cylinder; and
an output shaft extending through and supporting said pump cylinder and said motor cylinder, said output shalt being rotatably supported in said housing through a plurality of rotatable bearings;
wherein said motor swash plate is supported by said motor pivot member so as to be pivotally movable, with a swash plate angle thereof being variably adjustable by the swash plate adjustment mechanism,
the swash elate adjustment mechanism comprising
a first shaft extending parallel to said output shaft,
a second shaft extending parallel to and substantially co-linear with said first shaft, the first shaft driven for rotation by the second shaft through a geared idler shaft,
an actuator which drives said second shaft, the actuator positioned above and adjacent to an outer end of said swash plate plunger pump such that the actuator does not overlie the swash plate plunger pump and swash plate plunger motor, and
an arm connecting said motor pivot member to said first shaft, the connection permitting an axial translation of the arm with respect to the first shaft.

6. The hydraulic continuously variable transmission of claim 5, wherein said motor casing has a concave hemispherical support socket formed therein, and wherein said motor pivot member is supported through sliding contact with said support socket of said motor casing.

7. The hydraulic continuously variable transmission of claim 5, wherein a servo motor of said swash plate adjustment mechanism is attached to a side surface on a first side of said auxiliary portion, and an identification mark display portion is provided on a second side surface of said auxiliary portion, substantially opposite said first side.

\* \* \* \* \*